Patented Aug. 20, 1940

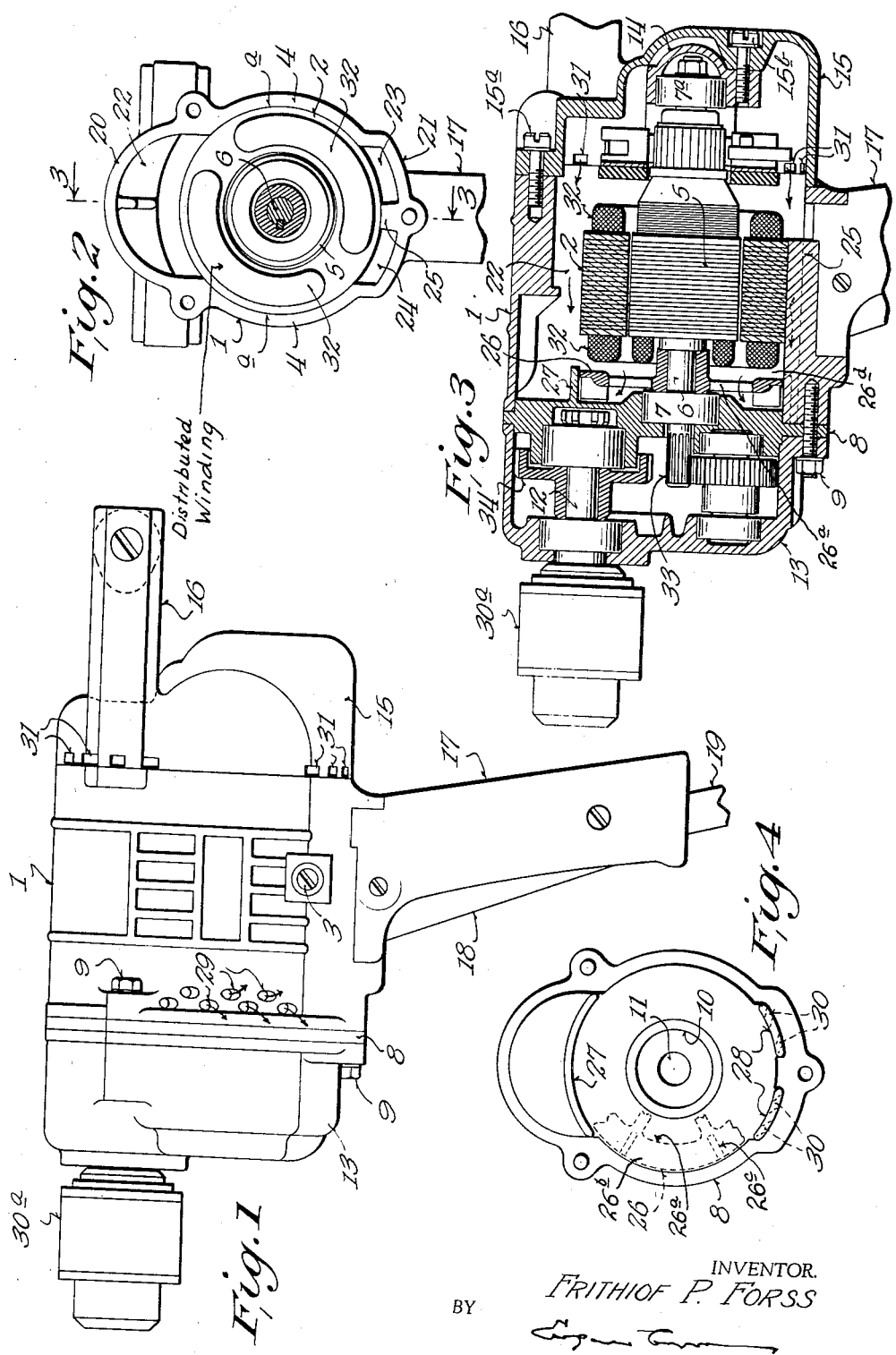

2,212,342

UNITED STATES PATENT OFFICE 2,212,342

ELECTRIC DRILL

Frithiof P. Forss, Aurora, Ill., assignor to Independent Pneumatic Tool Co., Chicago, Ill., a corporation of Delaware Application March 30, 1938, Serial No. 198,916

2 Claims. (Cl. 172—36)

This invention relates to portable electric motor driven hand tools of the drill, screw driving, reamer and the like type.

The principal object of my invention is to mount the stator of the motor in the tool directly in contact with the side walls of the motor case so as to narrow the tool laterally and thus reduce its transverse dimensions to promote ease of handling and use of the tool in close quarters.

A further object of my invention is to extend the portions of the motor case between its points of contact with the stator outwardly therefrom to provide channels for the flow of air through the case to cool the motor in the operation of the tool.

The invention consists further in the features hereinafter described and claimed.

In the accompanying drawing—

Fig. 1 is a side view of an electric drill embodying the features of my invention;

Fig. 2 is a view looking into the front end of the motor case, the forward parts of the tool being removed;

Fig. 3 is a longitudinal sectional view with parts broken away and in elevation, respectively, taken on line 3—3 of Fig. 2; and Fig. 4 is a view of the cover plate for the front end of the motor case.

The drill shown in the drawing is of the one-half inch capacity or size. It is provided with a universal electric motor operable on a 110 volt current.

The motor is of the distributed winding type as used in tools of this character and is housed within the motor case 1 of the tool. The stator 2 of the motor is fixed in the motor case by a number of set screws, one of which is shown at 3 in Fig. 1. The stator is mounted directly against the side walls 4, 4 of the motor case, the extent of contact being indicated at $a$, $a$ in Fig. 2. These walls conform to the arcuate curvature of the stator and each wall engages approximately one-quarter of the outer circumference of the stator. This provides an effective support for the stator in the motor case and holds the stator against vibration and displacement.

The armature 5 of the motor rotates within the stator and is mounted on a shaft 6 which extends beyond the ends of the motor case and is mounted in anti-friction bearings 7, 7a exteriorly of said case. The front bearing indicated at 7 in Fig. 3 is in the cover plate 8 which closes the open front end of the motor case. This plate is clamped in place by bolts some of which are shown at 9, 9 in Fig. 1. The plate 8 has a recess 10 to support the front bearing 7. The shaft 6 extends through an opening 11 in the plate 8 at the bottom of the recess 10 so that the shaft may be connected to the spindle 12 of the tool for rotation by the motor. The connection comprises a reducing gearing disposed in a gear case housing 13 at the front end of the tool. The housing 13 is secured to the motor case by the bolts referred to. The plate 8 is interposed between the motor case and the gear housing as shown.

The rear bearing 7a for the motor is supported by a bracket 14 secured to the rear end of the motor case and which bracket is enclosed by a closure cap 15 releasably secured to the rear end of the motor case by fasteners 15a, 15b shown in Fig. 3. The rear handle 16 is carried by this closure cap and extends rearwardly from the motor case in general alinement with the spindle 12. The side handle 17 of the tool is secured to the underside of the motor case as shown and contains the control switch (not shown) for the motor as in tools of this character. The actuating member for the switch is indicated at 18. This member is accessible on the forward side of the handle and closes the switch on being drawn toward the handle. The current supply cable for the tool is marked 19 and, as shown in Fig. 1, said cable extends into the handle 17 at its lower end.

It will be noted from Fig. 2 that the upper portion 20 of the motor case extends above the top portion of the stator 2 and that the lower portion 21 of the motor case extends below the lower portion of the stator. This arrangement provides air flow channels in the motor case for cooling the motor even though the stator is mounted in the motor case in direct contact with its side walls as shown. The air channels extend axially of the motor case from one end thereof to the other with the upper channel formed by the upwardly extended portion 20 of the case and the lower channel formed by the downwardly extended portion 21 as shown. The upper channel is marked 22. The lower channel is divided into two passage-ways 23, 24 by an interposed partition wall 25, the latter being in the form of a rib cast integral with the motor case and extending lengthwise thereof as shown in Fig. 3. This rib also forms a lower support for the stator 2.

A rotary fan element 26 having a concentrically disposed air intake 26a (Fig. 4) is mounted on the armature shaft 6 immediately adjacent the forward end of the motor case. The plate 8 forms the front wall of the fan chamber. The cylindrical wall of the fan chamber about the periphery of the fan is formed in part by the side walls 4, 4 of the motor case throughout the portions $a$, $a$ in contact with the stator as indicated in Fig. 4. The remaining portion of said cylindrical wall is formed by flange portions made integral with the plate 8 and extending laterally therefrom into the motor case across the air channels 22, 23 and 24. The flange at the upper channel is marked 27. The flange portion at the lower channel is divided into two flanges 28, 28, one for each passage-way 23, 24. The flanges 28 extend from the rib 25 to the adjacent case wall 4. The body wall $26b$ of the fan 26 forms the rear wall of the fan chamber and carries a series of vanes or blades $26c$ at the periphery of the fan, as shown in Fig. 4. The blades $26c$ project across the fan chamber from the fan wall $26b$ and extend radially between the centrally disposed air intake opening $26a$ in the fan wall $26b$ and the cylindrical wall of the fan chamber as previously described. The fan 26 is disposed forwardly of the stator 2 to provide a spaced $26d$ between them which space connects the intake opening $26a$ of the fan with the air channels 22, 23 and 24 at the forward end of the motor case as shown in Fig. 3. The discharge ports 29, 29 for the fan are in the case walls 4 and connect with the fan chamber at the periphery of the fan as shown in Fig. 1. These ports are disposed tangential to the periphery of the fan to avoid back pressure as in my prior Patent No. 1,652,401 granted December 13, 1927.

The bottom flanges 28 are also provided with discharge ports 30, 30 to serve discharge ports in the motor case opposite the flanges 28. The chuck $30a$ for the tool is secured to the spindle as shown in Fig. 1. The air intake openings for the channels 22, 23 and 24 are located at the rear end of the motor case. These openings or ports may be provided in the rear closure member 15 in its edge which engages the motor case as indicated at 31, 31 in Fig. 1. The fan 26 when rotated by the motor of the tool draws air into the air channels through the intake ports 31 at the rear end of the tool and causes such air to flow along the air channels over the stator towards the front end of the tool. This air is drawn into the space $26d$ between the fan and the front end of the stator and into the fan chamber through the intake opening $26a$ of the fan as indicated by the arrows in Fig. 3. The air is discharged from the fan chamber through the discharge ports 29, 29 in the motor case 1 as indicated by the arrows in Fig. 1. Hence, the stator and the case walls are cooled, the circulating air being drawn into the motor case from the outside and traveling in contact with both the stator and the case walls along the channels 22, 23 and 24.

The stator 2 carries a distributed winding the loops of which are marked 32, 32 in Figs. 2 and 3. The winding is within the peripheral confines of the stator plates and hence the stator may be mounted in the motor case in direct contact with the side walls thereof to laterally narrow the tool for ease in handling and use in close quarters.

The drive in the gear case 13 comprises a suitable gear arrangement connecting the armature shaft 6 to the spindle 12. The gear assembly includes gear teeth 33 on the shaft 6 and a gear member 34 fixed to the spindle 12.

The details of construction and arrangement of parts shown and described may be variously changed and modified without departing from the spirit and scope of my invention, except as pointed out in the annexed claims.

I claim as my invention:

1. In a portable electric tool of the character described, a motor case, an electric motor having an armature and a stator located within said case, said stator surrounding the armature and having direct contact at its outer periphery with the side walls of the motor case for a considerable portion of the outer circumference of the stator and for substantially the full axial dimension thereof, said motor case having a portion between said side walls extended outwardly from the stator to be out of contact therewith to provide an axially extending air flow channel between the stator and the motor case, closure means for the front end of the motor case and providing in connection therewith a fan chamber within said case, a fan and a spindle driven by the motor, said fan being located in said fan chamber and having a center intake opening connected with said air channel adjacent the front end of the motor case, and intake and discharge ports for said air channel, the intake ports being connected to the air channel adjacent the rear end of the motor case, and the discharge ports being in the motor case adjacent to the periphery of the fan.

2. In a portable electric tool of the character described, a motor case, an electric motor having an armature and a stator located within said case, said stator surrounding the armature and having direct contact at its outer periphery with the side walls of the motor case, the latter having portions between said side walls out of contact with the stator to provide axially extending air flow channels between the stator and the motor case, a cover plate closing the front end of the motor case and providing the front wall of a fan chamber, flange portions on the cover plate extending into the motor case across said air channels to provide with the side walls of the motor case the cylindrical portion of the fan chamber, a fan and a spindle driven by the motor, said fan being located within said fan chamber and having a center intake opening connected with the air channels adjacent the front end of the motor case, and intake and discharge ports for said air channels, the intake ports being connected with the air channels adjacent the rear end of the motor case and the discharge ports being in the motor case adjacent to the periphery of the fan.

FRITHIOF P. FORSS.